United States Patent
Baba et al.

[11] Patent Number: 5,240,684
[45] Date of Patent: Aug. 31, 1993

[54] CRYSTAL DIAMETER MEASURING DEVICE

[75] Inventors: Masahiko Baba, Annaka; Hiroyuki Ibe, Hukui, both of Japan

[73] Assignee: Shin-Etsu Handotai Company, Limited, Tokyo, Japan

[21] Appl. No.: 736,293

[22] Filed: Jul. 29, 1991

[30] Foreign Application Priority Data

Jul. 28, 1990 [JP] Japan .................... 2-199674

[51] Int. Cl.$^5$ ............................ C30B 15/20
[52] U.S. Cl. .................. 422/249; 422/106; 156/601; 156/617.1; 156/618.1
[58] Field of Search .......... 422/106, 249; 156/601, 156/617.1, 618.1

[56] References Cited

U.S. PATENT DOCUMENTS

| | | | |
|---|---|---|---|
| 4,794,263 | 12/1988 | Katsuoka et al. | 250/560 |
| 4,915,775 | 4/1990 | Katsuoka et al. | 156/601 |
| 4,926,357 | 5/1990 | Katsuoka et al. | 156/601 |
| 5,020,907 | 6/1991 | Ibe | 356/153 |

OTHER PUBLICATIONS

P. J. Roksnoer et al, "Growth of Dislocation-Free Gallium-Phosphide Crystals from a Stoichiometric Melt.," *Journal of Crystal Growth*, vol. 40, No. 1, pp. 6–12, Sep. 1977.

*Patent Abstracts of Japan*, vol. 7, No. 248 (C-193), Nov. 4, 1983, JP-A-58 135 197, Aug. 11, 1983.

*Patent Abstracts of Japan*, vol. 11, No. 132 (C-417), Apr. 24, 1987, JP-A-61 266 391, Nov. 26, 1986.

*Patent Abstract of Japan*, vol. 12, No. 446 (C-546) Nov. 24, 1988, JP-A-63 170 296, Jul. 14, 1988.

*Primary Examiner*—Robert Kunemund
*Attorney, Agent, or Firm*—Browdy and Neimark

[57] ABSTRACT

A device for measuring the diameter of the growing portions of the single crystals grown by the Czochralski technique is provided. This device is capable of measuring the crystal diameter with a high degree of accuracy over a wide range from the small-diameter portion thereof to the large diameter portion. A one-dimensional camera 28 and a two-dimensional camera 48 are fixed to a shoulder chamber 34 in such a manner that the optical axes thereof are parallel to each other. An optical path switch-over device, consisting of a cylinder 56, a movable plane mirror 52 mounted on a cylinder rod, and a fixed plane mirror 54, is provided. When the diameter of a neck portion of the single crystal 20 having a diameter of 10 mm or less is measured, the light reflected by the plane mirrors 52 and 54 is made incident on the two-dimensional camera 48, and the diameter of a bright ring 27 is measured on the basis of the image obtained by the two-dimensional camera. To measure the diameter of the conical and cylindrical portions 24 and 26 having a diameter of 10 mm or more, an image of a line lying across the bright ring 27 is obtained by the one-dimensional camera 28 by retracting the plane mirror 52, and the diameter of the bright ring 27 is measured.

3 Claims, 9 Drawing Sheets

CRYSTAL DIAMETER MEASURING DEVICE

BACKGROUND OF THE INVENTION

1. Field of the Invention

The present invention relates to a crystal diameter measuring device for measuring the diameter of the growing portions of single crystals grown by the Czochralski (CZ) technique.

2. Description of the Related Art

The Czochralski single crystal growth apparatus is designed to grow a single crystal 20 by immersing a seed crystal 18 held at the lower end of a wire 14 with a holder 16 into a melt generated by heating a polycrystalline material accommodated in a quartz crucible 10 by a heater (not shown) provided around the quartz crucible 10 and then by pulling the seed crystal 18 up with wire 14 from the melt 12, as shown in FIG. 11. The single crystal 20 has a neck portion 22 whose diameter is narrowed from about 10 mm of the diameter of the seed crystal 18 to 2 to 5 mm in order to push out dislocations from the bulk, a conical portion 24 whose diameter increases gradually, and a cylindrical body portion 26 having a diameter of, for example, 150 mm and used for preparing wafers.

To make the shape of the thus-prepared single crystal 20 coincide with a desired pattern, the diameter D of the growing portion of the single crystal 20 is measured. This is accomplished by detecting the diameter of the image of a bright ring 27 formed on an interface between the single crystal 20 and the melt 12, because the diameter D of the growing portion is in proportion to the diameter of the image of the bright ring 27.

To measure both the diameter of the relatively thin neck portion 22 and that of the relatively thick cylindrical portion 26 with a high degree of accuracy, a measuring method has been proposed (in Japanese Patent Laid-Open No. 87482/1987) in which the diameter of the growing portion of the crystal is measured by obtaining an image thereof using a two-dimensional camera with a zoom lens and then by processing the obtained image.

However, accurate measurements of the diameter spreading over a range from 2 mm to 150 mm require a zoom lens having a magnification of at least 6. Furthermore, a zoom lens having a large magnification has a narrow field of view. Consequently, when the vertical position of the surface of the melt 12S changes, the position of the camera must be moved in the vertical direction accordingly, or the angle of inclination of the optical axis of the camera must be changed accordingly.

Where
L: subject distance (mm)
X: lateral field of view (mm)
f: focal distance of a lens (mm)
D: lateral resolution of a camera (mm/bit),
we have the following equations:

$$L = (1 + 1/8.8\, X)f \quad (1)$$

$$D = X/756 \quad (2)$$

In the case of the measurements of the diameter of the neck portion 22, $f=180$, $L=900$, $X=35.2$, and $D=0.05$.

In the case of the measurement of the diameter of the cylindrical portion 26, $f=30$, $L=900$, $X=255.2$, and $D=0.33$ (which is not good).

To overcome the aforementioned problems, the method of measuring the diameter of the single crystal 20 using a one-dimensional camera 28, as shown in FIG. 11, has been used (Japanese Patent Laid-Open No. 112493/1988).

In this method, a line sensor 30 of the one-dimensional camera 28 is desirably disposed in the plane containing the wire 14, and the image of the point where the plane intersects the bright ring 27 is formed on the line sensor 30 by a lens 32. The diameter D of the single crystal 20 is detected from the pixel position X of the bright point. The diameter D is also dependent on both the horizontal distance R from the central line of the single crystal 20 to the central point of the line sensor 30 and the vertical distance H from the melt surface 12S to the central point of the line sensor 30. Since the distance R is constant, the diameter D is determined by X and H. This is expressed by $D = F(X, H)$. The diameter D is dependent on the height H also in the measurements which use the two-dimensional camera.

A camera with an area sensor is generally used as the two-dimensional camera. The number of pixels of one line of such a camera is about 512 pixels at maximum, whereas the number of pixels of a line sensor 30 is, for example, 2048 or 4096. In the measuring method which uses the one-dimensional camera, since the point where the plane containing the wire crosses the bright ring 27 is detected, it is possible to accurately measure the diameter D of the single crystal 20 by the fixed one-dimensional camera 28 even when the height of the melt surface 12S is varied.

However, measuring the diameter of the neck portion 22 using this one-dimensional camera 28 has a drawback in that, since the diameter D is relatively small, vibrations of the neck portion 22 in the horizontal direction may preclude the image of the bright point from being focused on the line sensor 30. This makes measurements of the diameter D impossible.

Furthermore, the present inventors have discovered that measuring the diameter D of the neck portion 22 by the one-dimensional camera 28 involves the following problem.

FIG. 12 shows the opening and closing states of a shoulder chamber 34 which covers a main chamber from above. An arm 36 protrudes from the peripheral surface of the shoulder chamber 34. When the polycrystal silicon is accommodated in the quartz crucible 10, the shoulder chamber 34 is rotated about a shaft 38 clockwise as viewed in FIG. 12 by 90 degrees to open the upper opening of the main chamber. After a desired polycrystal has been accommodated within the quartz crucible 10, the shoulder chamber 34 is rotated in the reverse direction by 90 degrees to close the upper opening of the main chamber. Since the distance between the center of the shaft 38 and the center of the shoulder chamber 34 is as large as, for example, 700 mm, a slight shift in the rotational angle of the shoulder chamber 34, which would be generated by the opening/closing operation, causes a shift 'd' in the position of the shoulder chamber 34 to be generated. When this shift 'd' in the position was measured, the maximum value of 1.5 mm was observed.

In the method which uses the one-dimensional camera, this shift 'd' in the position influences the precision of the diameter measurement.

SUMMARY OF THE INVENTION

An object of the present invention is to provide a method of measuring a crystal diameter which allows the diameter of crystals to be accurately measured over a range from a small-diameter portion thereof to a large-diameter portion thereof without changing the height of the camera or the direction of the optical axis thereof even when the level of the melt surface is varied during the growth of the crystal.

To achieve this object, the present invention provides a device for measuring the diameter of the growing portions of single crystals grown within a chamber using the Czochralski technique which comprises a two-dimensional camera for outputting a video signal representative of the growing portion, a first means for detecting the diameter of the growing portion from the diameter of a bright ring image on the basis of the video signal of the two-dimensional camera, a one-dimensional camera for outputting a video signal representative of an image on a line lying across the bright ring of the growing portion, a second means for detecting the diameter of the growing portion from the position of a bright point on the basis of the video signal of the one-dimensional camera, and a selection means for outputting the diameter detected by the first detection means at the initial stage of the measurement in which the diameter is small and for outputting the diameter detected by the second detection means thereafter.

At the initial stage of the crystal growth in which the diameter of the crystal is relatively small, since the level of the surface of the melt is constant, it is not necessary to move the two-dimensional camera used at that time. Furthermore, the two-dimensional camera is used only at the initial stage of the crystal growth, and it is therefore not necessary to change the magnification of the photographing lens. This allows for the use a photographing lens having a fixed high magnification, and thus enables the diameter of the crystal to be measured with a high degree of accuracy.

Thereafter, a one-dimensional camera having a larger number of pixels on the straight line than the two-dimensional camera is used to obtain the image of the line lying across the bright ring of the growing portion of the single crystal. Consequently, even when the level of the surface of the melt changes due to the crystal growth, it is not necessary to move the one-dimensional camera. Furthermore, accurate diameter measurements are possible.

Both of the one- and two-dimensional cameras may be disposed such that they are compatible in a two-way use with a single view port of the chamber.

In the aforementioned crystal diameter measuring device, an optical path switch-over device for directing the light from the growing portion to either of the one- and two-dimensional cameras by moving the mirror may be provided. In this way, both the one- and two-dimensional cameras can be disposed concurrently at the single view port of the chamber, and the structure of the measuring device can thus be simplified.

The optical path switch-over device includes first and second plane mirrors which are inclined with respect to the direction of propagation of the light directed from the growing portion to the view port and which are disposed in opposed relation to each other, and a guide for guiding the first plane mirror in the direction substantially perpendicular to the direction of the propagation of the light and between the position where the first plane mirror just faces the view port and the position located sideways from the view port. The optical path switch-over device is constructed such that when the first plane mirror is located at the position where it faces the view port, the light from the growing portion passes through the view port, is reflected first by the first plane mirror and then by the second plane mirror, and is then made incident on the two-dimensional camera, and such that when the first plane mirror is located sideways of the view port, the light from the growing portion passes through the view port and is then directly made incident on the one-dimensional camera.

When the crystal diameter is measured from the bright ring image obtained by the two-dimensional camera, a slight shift in the optical axis causes the entirety of the bright ring image to be translated, and thus does not arouse the problem. When the crystal diameter is measured from the single point (bright point) of the bright ring image obtained by the one-dimensional camera, a slight shift in the optical axis moves the bright point alone while the center of the assumption is maintained fixed, and thus affects the precision of the diameter detection.

However, in the present invention, since the light from the growing portion is made incident directly on the one-dimensional camera without being passed through the mirror, a slight shift in the optical axis generated by the movement of the mirrors does not affect the precision of the diameter detection, and the crystal diameter can thus be measured with a high degree of accuracy over the entire range from the small-diameter portion of the crystal to the large-diameter portion thereof.

Preferably, the crystal diameter measuring device further includes a means for correcting the diameter detected by the second detection means such that the diameter detected by the second detection means coincides with the diameter detected by the first detection means when the selection is made by the selection means.

When the crystal diameter is detected from the single point of the bright ring image obtained by the one-dimensional camera, a slight shift in the optical axis affects the diameter detection precision, as stated above. When a polycrystal is charged in the crucible, the chamber must be opened and closed. This may generate a slight shift in the optical axis of the one-dimensional camera.

However, in the present invention, since the diameter detection errors generated by a shift in the optical axis or the like can be automatically corrected, measurement precision can be further improved.

DETAILED DESCRIPTION OF THE PREFERRED EMBODIMENTS

An embodiment of the present invention will be described below with reference to the accompanying drawings.

Figure 1:
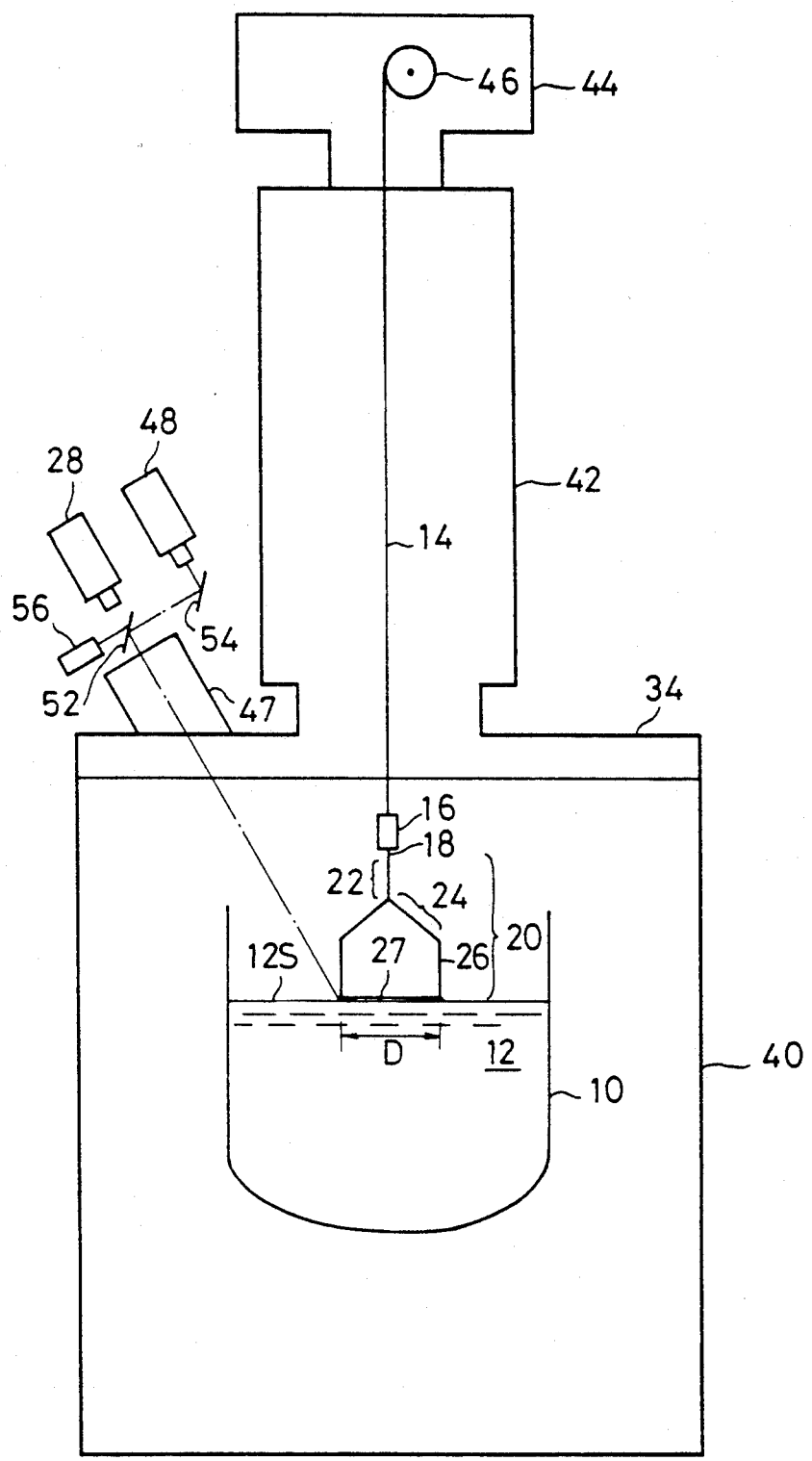
FIG. 1 schematically shows the arrangement of an optical system of a crystal diameter measuring device for use in a Czochralski crystal growth apparatus.
Figure 11:
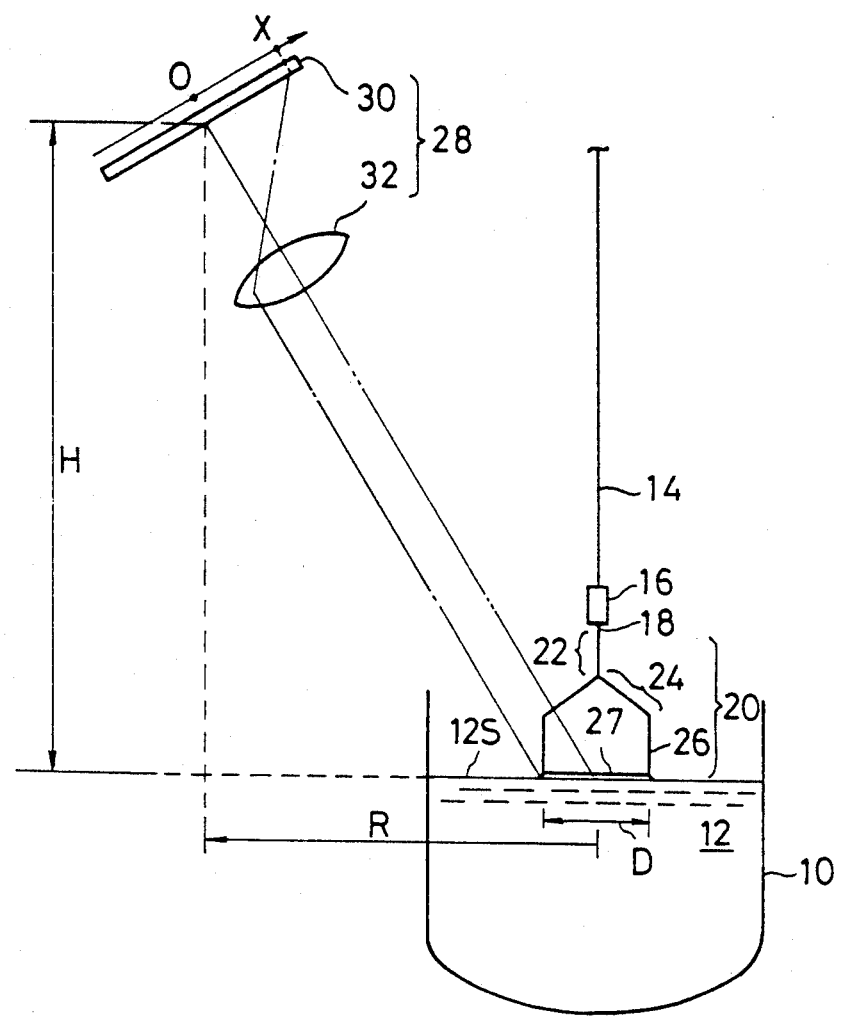
FIG. 11 illustrates the principle of measuring the crystal diameter using the one-dimensional camera 28.
Figure 12:
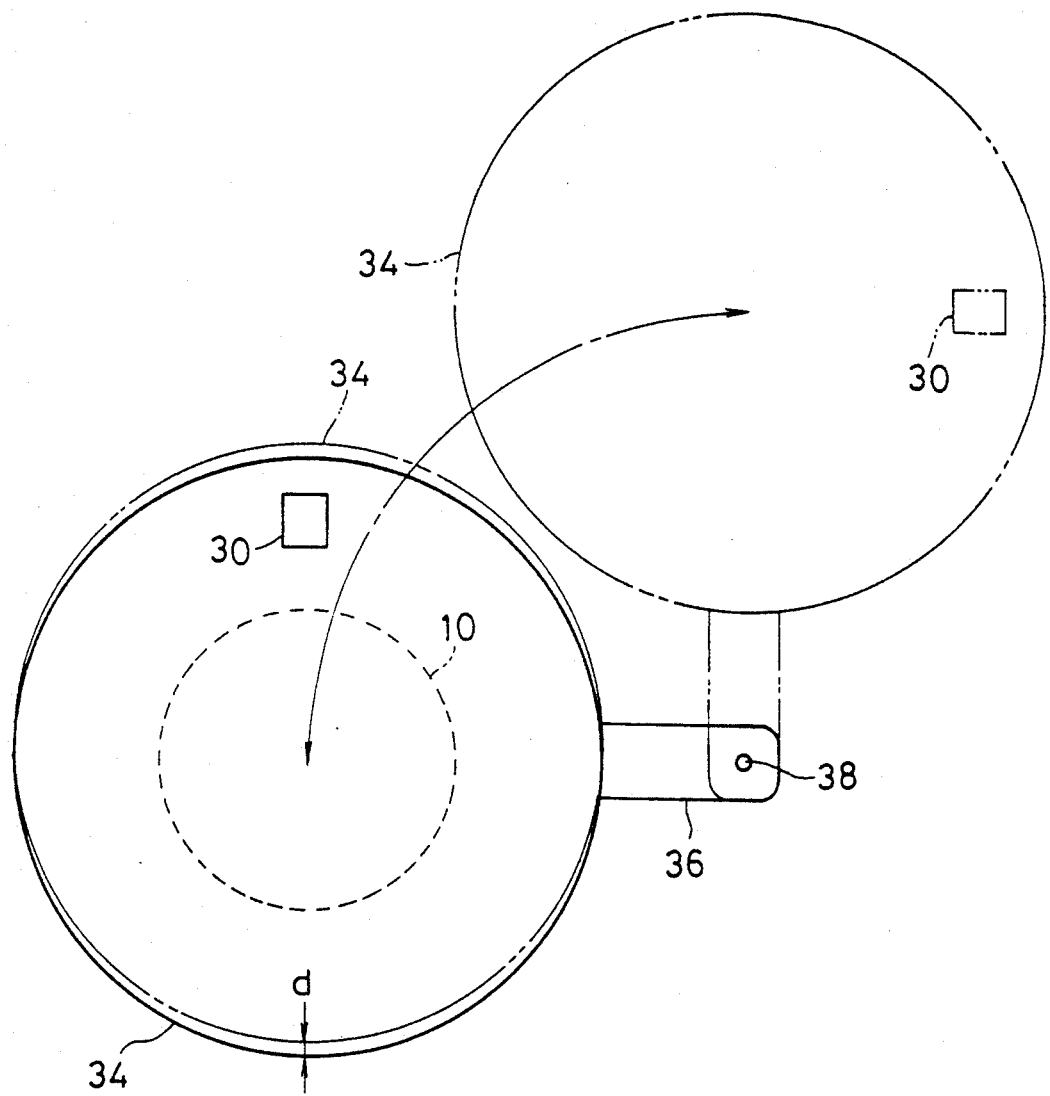
FIG. 12 is a plan view of the shoulder chamber 34 which is opened and closed to open and close the upper opening of a main chamber.

FIG. 1 schematically shows the arrangement of an optical system of a crystal diameter measuring device for use in a Czochralski single crystal growth apparatus. In FIG. 1, the same reference numerals are used to denote the same components that are shown in FIG. 11, same description thereof being omitted.

The quartz crucible 10 is accommodated within the main chamber 40 whose upper opening is covered by the shoulder chamber 34. A pull chamber 42 is coaxially connected to the upper opening of the small-diameter portion of the shoulder chamber 34. The upper opening of the pull chamber 42 is covered by a rotation/pull driving portion 44 which is rotatable with respect to the pull chamber 42. The rotation/pull driving portion 44 houses a take-up drum 46 around which the wire 14 is wound. The wire 14 is rotated about its own central axis by the rotation of the rotation/pull driving portion 44 relative to the pull chamber 42 by a motor which is not shown.

The shoulder chamber 34 has a view port 47. To allow the operator to observe the growing portion of the single crystal 20 through the view port 47, a one-dimensional camera 28 provided with, for example, a CCD line sensor is fixed to the shoulder chamber 34 in the same manner as that shown in FIG. 11. To the shoulder chamber 34 is also fixed a two-dimensional camera 48 provided with, for example, a CCD area sensor. The optical axis of the two-dimensional camera 38 is made parallel to that of the one-dimensional camera 28.

The number of pixels of the one-dimensional camera 28 is, for example, 2048 or 4096, whereas that of one line of the two-dimensional camera 48 is 512. The two-dimensional camera, however, uses a lens having a high magnification which assures that one pixel corresponds to, for example, 0.05 mm.

Figure 2:
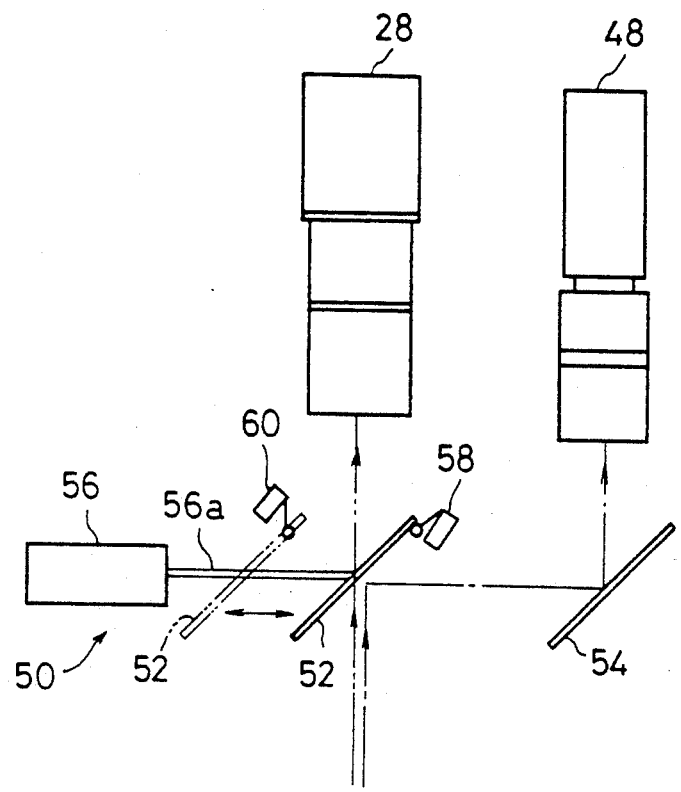
FIG. 2 shows the arrangement of an optical path switch-over device and cameras of FIG. 1.

Between the view port 47 and the one- and two-dimensional cameras 28 and 48, an optical path switch-over device 50 is mounted on the shoulder chamber 34, as shown in FIG. 2. The optical path switch-over device 50 includes a movable plane mirror 52 and a fixed plane mirror 54 which are disposed parallel to each other and in opposed relation. The reflecting surface of each mirror is inclined by 45 degrees relative to the direction of propagation of the light directed outward from the growing portion of the single crystal through the view port. The movable plane mirror 52 is fixed to the tip of a cylinder rod 56a of a cylinder 56, and is thus movable in the direction (indicated by arrows in FIG. 2) perpendicular to the optical axis of the one- and two-dimensional cameras 28 and 48. Movement of the movable plane mirror 52 is guided by a guide which is not shown. Limit switches 58 and 60 are provided at positions where the limit switch 58 is operated when the cylinder rod 56a is extended and the movable plane mirror 52 is thereby located at the position indicated by the solid line while the limit switch 58 is operated when the cylinder rod 56a contracts and the movable plane mirror 52 is thereby located at the position indicated by the alternate long and two short dash line. When the movable plane mirror 52 is in the state indicated by the alternate long and two short dash line, the light from the growing portion of the single crystal passes through the view port 47 and is then directly made incident on the one-dimensional camera 28. When the movable plane mirror 52 is in the state indicated by the solid line, the light from the growing portion is reflected by the plane mirrors 52 and 54 and is thereby directed to the two-dimensional camera 48.

At the initial stage of the measurement, the movable plane mirror 52 is at the position indicated by the solid line. When the diameter of the conical portion 24 has increased to, for example, 10 mm, the cylinder rod 56a retracts and the optical path switch-over device 50 is thereby rendered to the state indicated by the alternate long and two short dash line. The pull rate of the single crystal 20 is approximately 1 mm/min, and changes in the diameter of the single crystal 20, which would occur during the operation of the optical path switch-over device 50, can thus be ignored.

Figure 3:
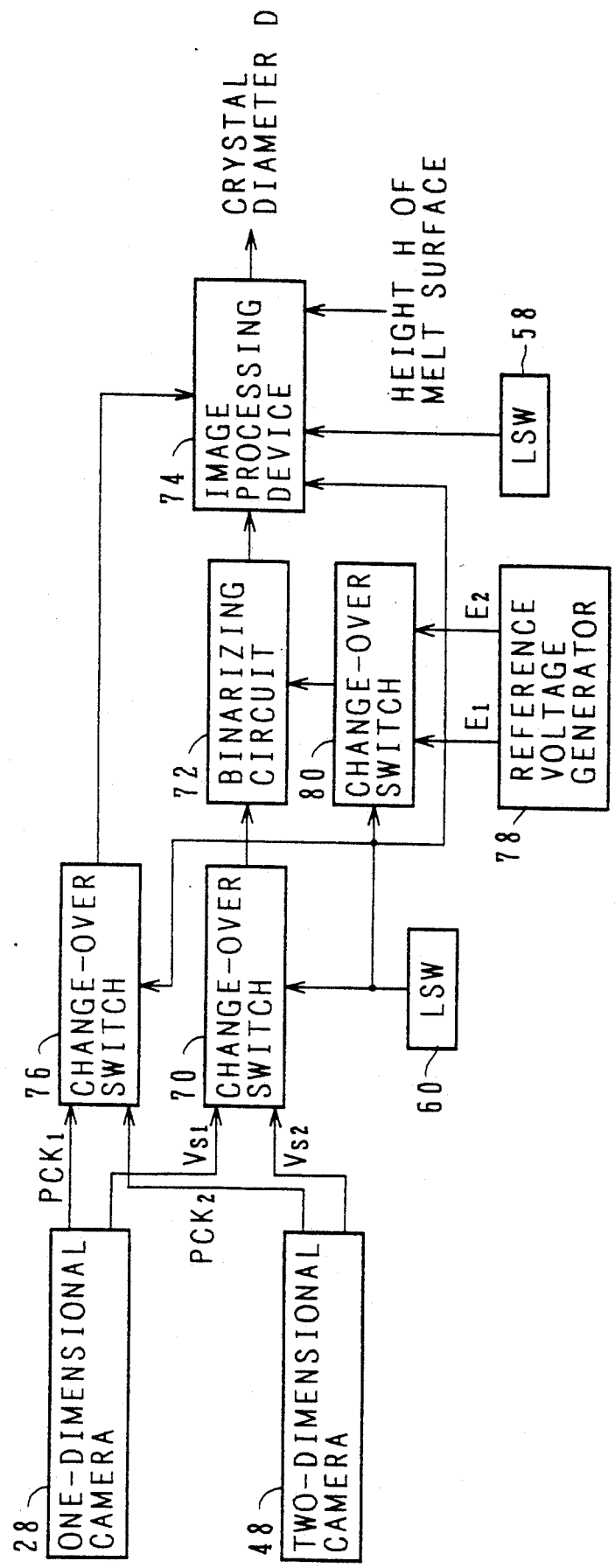
FIG. 3 is a block diagram of the crystal diameter measuring device.

FIG. 3 shows the configuration of the crystal diameter measuring device.

The one-dimensional camera 28 outputs a video signal $V_{S1}$ and a pixel clock $PCK_1$ for separating the individual pixels. Similarly, the two-dimensional camera 48 outputs a video signal $V_{S2}$ and a pixel clock $PCK_2$ for separating the individual pixels. The video signals $V_{S1}$ and $V_{S2}$ are supplied to a change-over switch 70 which selectively outputs either of the video signals to a binarizing circuit 72. The binarizing circuit 72 binarizes the input voltage and supplies a binary value to an image processing device 74. The pixel clocks $PCK_1$ and $PCK_2$ are supplied to a change over switch 76 which selectively supplies either of the pixel clocks to the image processing device 74. Either of voltages $E_1$ and $E_2$ generated by a reference voltage generator 78 is selectively supplied to the reference voltage input terminal of the binarizing circuit 72 by a change-over switch 80. The change-over switches 70, 76 and 80 are switched-over by a signal from the limit switch 60 such that they respectively output the video signal $V_{S1}$, the pixel clock $PCK_1$ and the voltage $E_1$ or the video signal $V_{S2}$, the pixel clock $PCK_2$ and the voltage $E_2$. The image processing device 74 is constituted by a microcomputer. The image processing device 74 reads in the video signal from the binarizing circuit 72 synchronously with the pixel clock from the change-over switch 76 and then performs image processing by the method determined by the operation signal from the limit switch 58 or 60, using the height H of the surface of the melt supplied from a device (not shown) to detect and output the diameter D of the single crystal.

Figure 4:
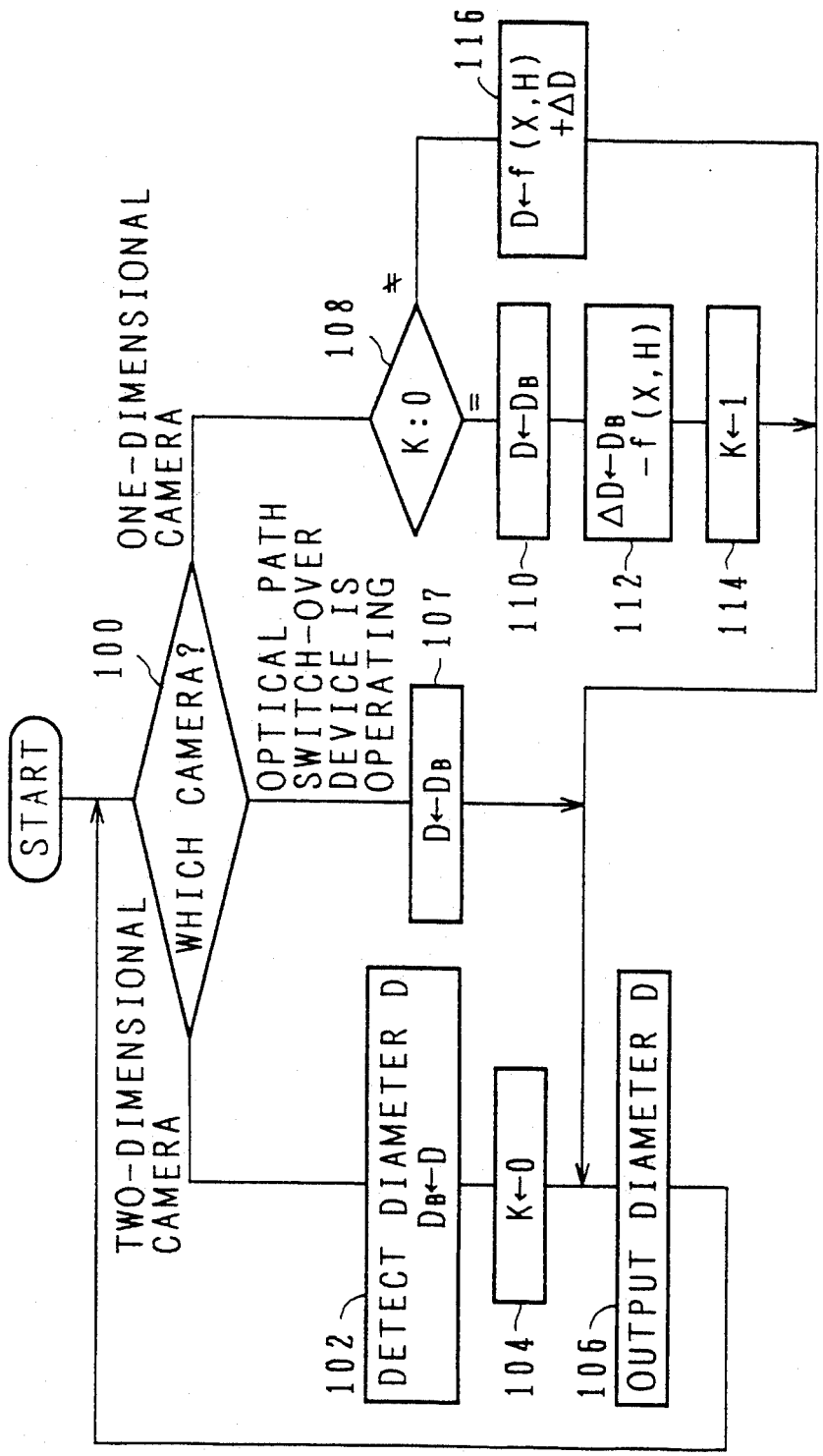
FIG. 4 is a flowchart showing the software configuration of an image processing device 74 of FIG. 3.

FIG. 4 shows the software configuration of the image processing device 74.

Figure 5:
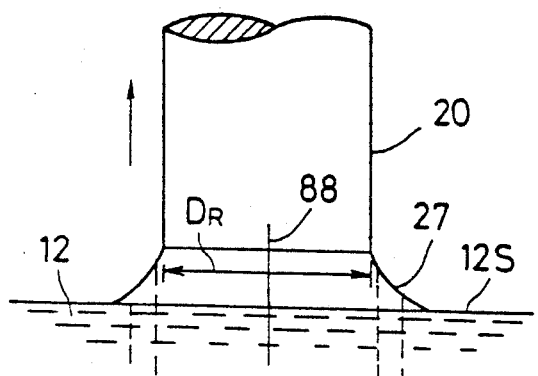
FIG. 5 shows the vicinity of the growing portion of a single crystal 20.
Figure 6:
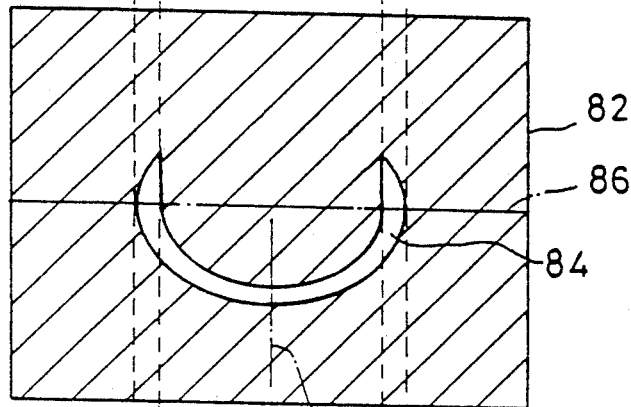
FIG. 6 shows a binary image of the image obtained by a two-dimensional camera 48.
Figure 7:
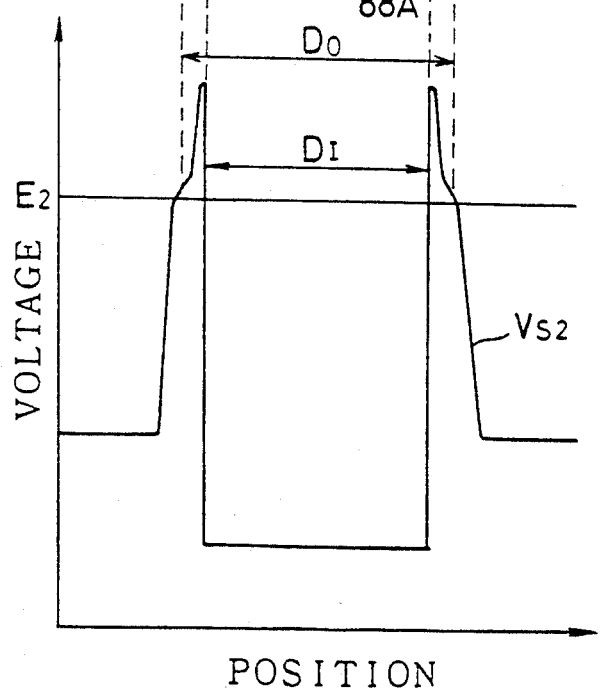
FIG. 7 shows the relationship between a video signal $V_{S2}$ representing the intensity of light taken along a straight line 86 of FIG. 6, output from the two-dimensional camera 48, and a reference voltage $E_2$.

When it is judged in step 100 that the limit switch 58 is operated, that is, that the output of the two-dimensional camera 48 is selected, a binary image 82 shown in FIG. 6 corresponding to FIG. 5 is processed in step 102 to detect, as the crystal diameter D, the maximum horizontal diameter $D_0$ or $D_1$ of an bright ring image 84 contained in the binary image 82. $D_0$ represents the outer diameter of the bright ring image 84, and $D_1$ represents the inner diameter thereof. FIG. 7 shows the relationship between the video signal $V_{S2}$ taken along a straight line 86 lying in the horizontal direction across the center of the binary image 82 shown in FIG. 6 and the reference value $E_2$.

Although the inner diameter $D_1$ and the outer diameter $D_0$ are subs y the same, the use of the outer diameter $D_0$ is desired during the automatic growth of the neck portion 22.

The crystal diameter D is stored as $D_B$.

Next, the step 104 0 is assigned to K in order to change flow of the processes.

Thereafter, the diameter D is output in step 106, and the process returns to step 100.

When it is determined in step 100 that the limit switch 58 is being turned off, the diameter $D_B$ detected in step 102 is set as D in the step 107, and then D is output in step 106.

When the limit switch 60 is operated, it is judged in step 108 whether or not K=0. In the first operation cycle, K=0, and the process goes to step 110.

In step 110, the diameter $D_B$ obtained in step 102 i.e., measured using the two-dimensional camera 48, is set as D. Next, in step 112, $D_B - F(X, H)$ is calculated, and the result is stored as ΔD.

As has been described in the paragraph of the related art, F (X, H) is the equation used to geometrically calculate the crystal diameter D from the bright point position X and the height H shown in FIG. 11. F (X, H) may be the empirical formula.

Figure 8:
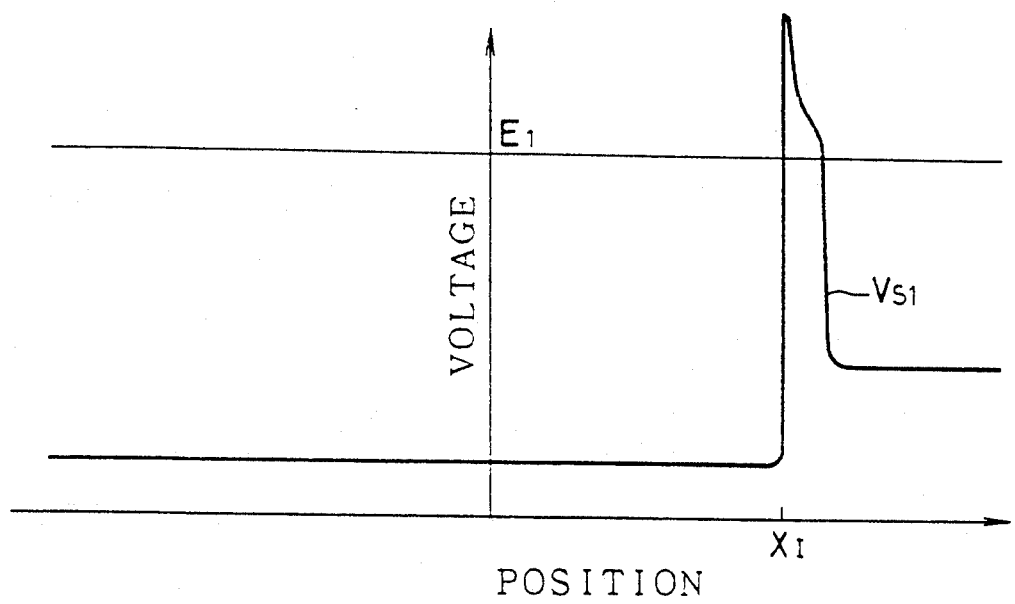
FIG. 8 shows the relationship between a video signal $V_{S1}$ representing the intensity of light taken along a straight line 88 of FIG. 5, output from the one-dimensional camera 28, and a reference voltage $E_1$.

FIG. 8 shows the relationship between the video signal $V_{S1}$ and the reference voltage $E_1$. The video signal $V_{S1}$ represents the intensity of light taken along a straight line 88 shown in FIG. 5, and corresponds to the intensity of light taken along a straight line 88A on the binary image 82 shown in FIG. 6. The inner position $X_I$ of the bright point may be used as the pixel position X of the bright point to calculate the diameter D.

Ideally, $D = F(X, H)$.

However, D does not coincide with F (X, H) due to a shift in the position of the shoulder chamber 34 caused by the opening/closing operation of the shoulder chamber 34. The diameter $D_B$ detected using the two-dimensional camera 48 is the diameter of the bright ring image 84 and is not thus affected by this shift in the position.

Hence, ΔD can work as a correction value relative to F (X, H).

In step 114, 1 is assigned to K, and then the diameter D is output in step 106.

In the subsequent operation cycle, it is judged in step 108 that K≠0. Therefore, the process goes to step 116, and F (X, H)+ΔD is calculated and the result is set as the diameter D. Thereafter, the process goes to step 106 and this diameter D is output.

Subsequently, the processings are repeated in the order of steps 100, 108, 116 and 106.

EXAMPLES

Figure 9:
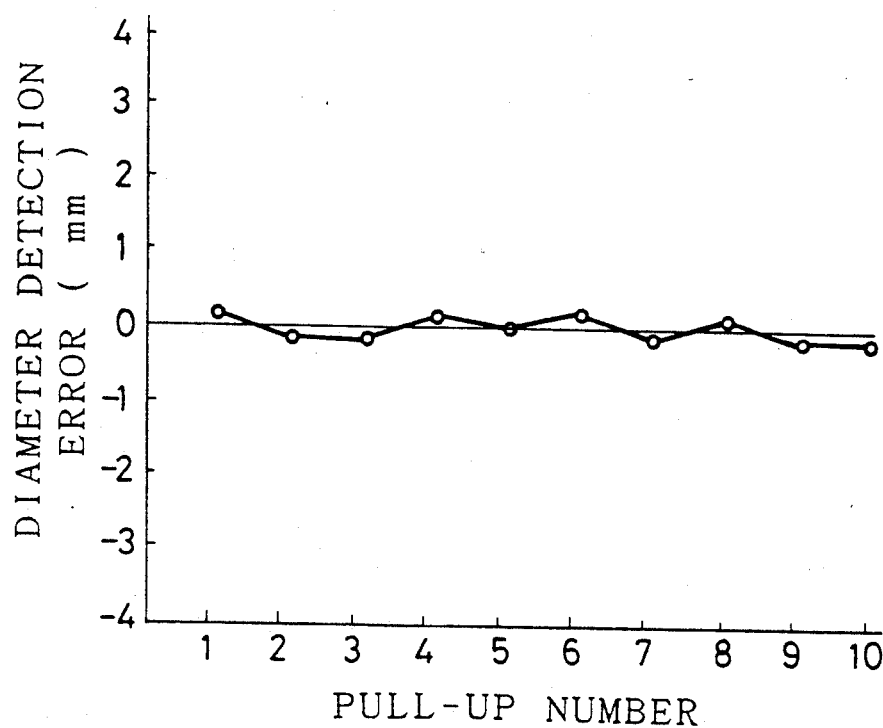
FIG. 9 is a graph showing the results of the tests conducted ten times in each of which a diameter detection error is detected using the measuring device according to the present invention each time the shoulder chamber 34 is operated.

The diameter detection error, which is the difference between the average value of the diameter D (which is about 150 mm) of the cylindrical portion 26 of the single crystal 20 measured using the crystal diameter measuring device having the aforementioned configuration and the average value of the diameter $D_R$ of the cylindrical portion 26 measured after the crystal growth using a side calipers, was obtained each time the shoulder chamber 34 was operated FIG. 9 shows the results obtained when such an error detection was conducted (on the cylindrical portions 26 of the ten single crystals 20) ten times.

Figure 10:
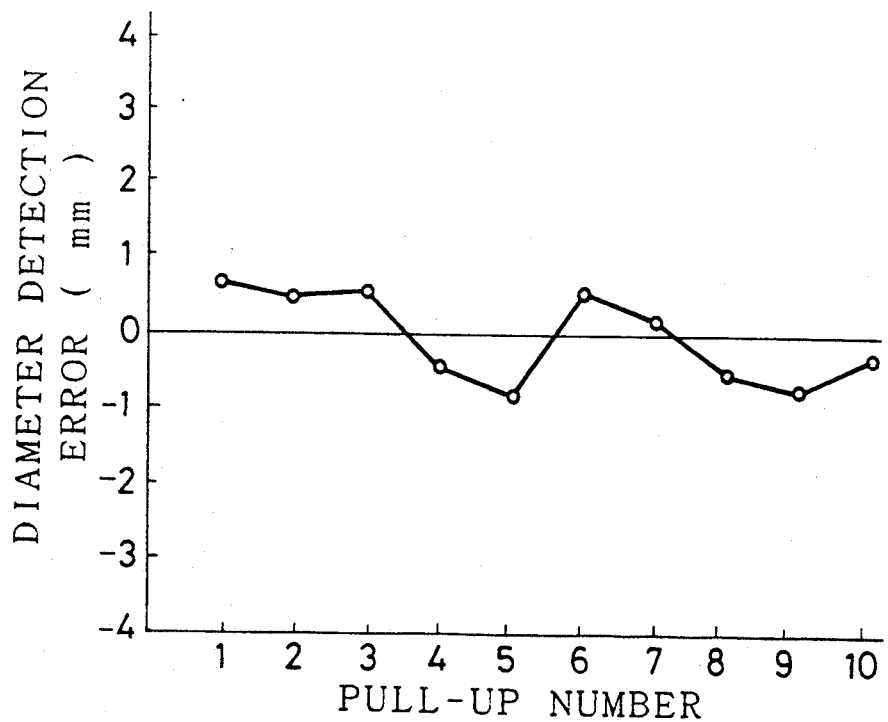
FIG. 10 is a graph corresponding to the graph of FIG. 9, showing the results of the tests conducted using the measuring device according to the present invention without correcting the diameter.

FIG. 10 shows the results of the diameter error detection obtained in the same manner using ΔD=0 in step 116 of the flowchart shown in FIG. 4.

As can be seen from FIGS. 9 and 10, the correction made in the present embodiment is effective.

What is claimed is:

1. A device for measuring a diameter of a single crystal growing portion having a bright ring and grown within a chamber by the Czochralski method, comprising:

a one-dimensional camera for imaging a line crossing over the bright ring of the single crystal growing portion and outputting a first video signal and a first pixel clock thereof;

a two-dimensional camera for imaging the bright ring and outputting a second video signal and a second pixel clock thereof;

a means for selecting the second video signal and the second pixel clock at an initial stage of measurement in which the diameter is comparatively small and for selecting the first video signal and the first pixel clock thereafter;

means for detecting the diameter of the single crystal growing portion based on the second video signal and the second pixel clock; and means for correcting a detected diameter such that the detected diameter based on the first video signal and the first pixel clock coincides with a detected diameter based on the second video signal and the second pixel clock when a selection is changed.

2. The device according to claim 1, wherein the one-dimensional camera and the two-dimensional camera are disposed such that they oppose a view port of the chamber, and wherein the device further comprising an optical path switch-over means for directing light from the signal crystal growing portion to either the one-dimensional camera or the two-dimensional camera by moving a mirror between two positions.

3. The device according to claim 2, wherein the optical path switch-over means comprising:

a first plane mirror;

a moving means for moving the first plane mirror linearly between a first position where the first plane mirror faces the view port while inclined so as to reflect the light from the signal crystal growing portion which passed through the view port and a second position where the first plane mirror is located sideways from the view port so as to allow the light from the single crystal growing portion which passed through the view port to pass directly to the one camera, in a direction substantially perpendicular to a direction which is from the single crystal growing portion to the view port; and a second plane mirror which is fixed so as to reflect the light from the first planar mirror to the other camera when the first plane mirror is located at the first position.

* * * * *